(12) United States Patent
Chien et al.

(10) Patent No.: US 11,336,914 B2
(45) Date of Patent: May 17, 2022

(54) HISTORY-BASED CANDIDATE LIST WITH CLASSIFICATION

(71) Applicant: QUALCOMM Incorporated, San Diego, CA (US)

(72) Inventors: Wei-Jung Chien, San Diego, CA (US); Chun-Chi Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/540,893

(22) Filed: Aug. 14, 2019

(65) Prior Publication Data
US 2020/0059658 A1   Feb. 20, 2020

Related U.S. Application Data

(60) Provisional application No. 62/764,851, filed on Aug. 16, 2018.

(51) Int. Cl.
*H04N 19/52* (2014.01)
*H04N 19/176* (2014.01)
*H04N 19/137* (2014.01)

(52) U.S. Cl.
CPC ........... *H04N 19/52* (2014.11); *H04N 19/137* (2014.11); *H04N 19/176* (2014.11)

(58) Field of Classification Search
CPC ..... H04N 19/52; H04N 19/137; H04N 19/176
USPC .................................................... 375/240.16
See application file for complete search history.

(56) References Cited

U.S. PATENT DOCUMENTS

| 9,549,181 B2 * | 1/2017 | Lin ...................... H04N 19/436 |
| 10,171,813 B2 | 1/2019 | Zheng et al. |
| 2004/0247194 A1 * | 12/2004 | Haskell ................ H04N 19/119 382/250 |
| 2011/0194609 A1 * | 8/2011 | Rusert .................... H04N 19/52 375/240.16 |

(Continued)

FOREIGN PATENT DOCUMENTS

WO   2012116212   8/2012

OTHER PUBLICATIONS

"Bilateral Filter", Wikipedia, Feb. 10, 2020, pp. 1-5.

(Continued)

*Primary Examiner* — Rebecca A Volentine
*Assistant Examiner* — Jimmy S Lee
(74) *Attorney, Agent, or Firm* — Qualcomm Incorporated

(57) ABSTRACT

Techniques are described for history-based candidate list operations in video coding for determining motion information for a current block. In one example, a device for decoding video data includes a memory configured to store a history-based candidate list and a video decoder. The video decoder is configured to construct the history-based candidate list by storing, in the memory, motion information of reconstructed blocks into the history-based candidate list as candidates of the history-based candidate list, identify a subset of candidates of the history-based candidate list, generate a candidate list based on the identified subset of candidates of the history-based candidate list, and reconstruct a current block based on the generated candidate list.

29 Claims, 8 Drawing Sheets

(56) References Cited

U.S. PATENT DOCUMENTS

| | | | | |
|---|---|---|---|---|
| 2011/0200112 | A1* | 8/2011 | Won | H04N 19/567 375/240.16 |
| 2013/0114717 | A1* | 5/2013 | Zheng | H04N 19/52 375/240.14 |
| 2014/0192881 | A1* | 7/2014 | Xu | H04N 19/52 375/240.16 |
| 2015/0264386 | A1* | 9/2015 | Pang | H04N 19/52 375/240.16 |
| 2016/0219302 | A1* | 7/2016 | Liu | H04N 19/583 |
| 2016/0286232 | A1* | 9/2016 | Li | H04N 19/70 |
| 2017/0264904 | A1* | 9/2017 | Koval | H04N 19/159 |
| 2019/0141318 | A1* | 5/2019 | Li | H04N 19/159 |
| 2020/0021839 | A1 | 1/2020 | Pham Van et al. | |

OTHER PUBLICATIONS

Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 Pages.

Chien W-J., et al., "CE4 related: Modification on History-based Mode Vector Prediction", 12. JVET Meeting, Oct. 3, 2018-Oct. 12, 2018, Macao, (The Joint Video Exploration Team of ISO/IEC JTC1/SC29/WG11 and ITU-T SG.16), No. JVET-L0401, Oct. 5, 2018 (Oct. 5, 2018), XP030194900, 5 Pages, Retrieved from the Internet: URL: http://phenix.int-evry.fr/jvet/doc_end_user/documents/12_Macao/wg11/JVET-L0401-v4.zip JVET-L0401_r3.docx [retrieved on Oct. 5, 2018] abstract section 2 with its sub-section.

Ergen S., "ZigBee/IEEE 802.15.4 Summary", Sep. 10, 2004, 37 Pages.

He K., et al., "Guided Image Filtering," IEEE Transactions on Pattern Analysis and Machine Intelligence, vol. 35, No. 6, Jun. 2013, 13 Pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/046693—ISA/EPO—dated Oct. 31, 2019 (18 pp).

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, the International Telecommunication Union, Jul. 2001, 74 Pages.

ITU-T H.265, "Series H: Audiovisual and Multimedia Systems, Infrastructure of audiovisual services—Coding of moving video, High efficiency video coding," The International Telecommunication Union. Dec. 2016, 664 Pages.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.

"Sum of absolute transformed differences", Wikipedia, Feb. 10, 2020, pp. 1-2.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Yu R., et al., "CE 4-2.1: Adding Non-adjacent Spatial Merge Candidates", JVET-K0228-v1, the Joint Video Exploration Team of ISO/IEC JTC1/SC29/WG11 and ITU-T SG.16 WP 3, 11th Meeting: Ljubljana, SI, Jul. 10-18, 2018, pp. 1-3.

Zhang (Bytedance) L., et al., "CE4-related: History-based Motion Vector Prediction", 11. JVET Meeting, Jul. 11, 2018-Jul. 18, 2018, Ljubljana, (The Joint Video Explorationteam of ISO/IEC JTC1/SC29/WG11 and ITU-TSG.16), No. JVET-K0104-v5, Jul. 18, 2018 (Jul. 18, 2018), XP030200019, 7 Pages, Retrieved from the Internet:URL:http://phenix.int-evry.fr/jvet/doc_end_user/documents/11_Ljubljana/wg11/JVET-K0104-v5.zip JVET-K0104 r4.docx [retrieved on Jul. 18, 2018] abstract sections 1-2.

Han et al., "CE4: Modification on History-based Motion Vector Prediction," Joint Video Exploration Team (JVET) of ITU-T SG 16 WP 3 and ISO/IEC JTC 1/SC 29/WG 11, 13th Meeting; Marrakech, MA, Jan. 9-18, 2019, JVET-M0126 (9 pp).

Hsiao Y-L., et al., "CE4.2-related: MV Buffer Reduction for Non-Adjacent Spatial Merge Candidates", JVET-K0246, 11th JVET Meeting in Ljubljana, Jul. 10-18, 2018, 12 pages.

Prosecution History for U.S. Appl. No. 62/692,388 dated from Jun. 29, 2018, through Jul. 5, 2018, 107 pages.

Technicolor: "CE4 related: Virtual Temporal Affine", JVET-K0267, Jul. 2018, 5 pages.

Zhang L., et al., "CE4-related: History-Based Motion Vector Prediction", Joint Video Experts Team (JVET) of ITU-T SG 16 WP 3 and ISO/IEC JTC 1/SC 29/WG 11, 11th Meeting, Ljubljana, SI, Jul. 10-18, 2018, JVET-K0104-v1, 5 pages.

* cited by examiner

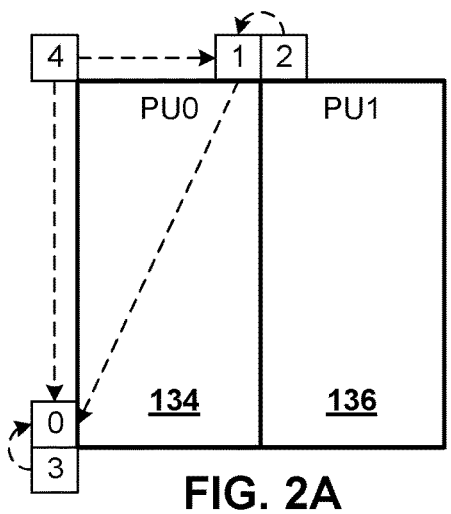
FIG. 2A
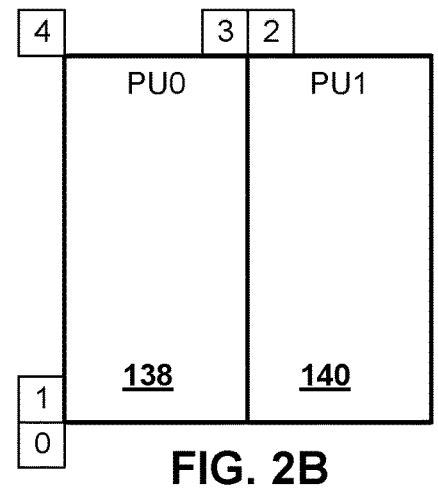
FIG. 2B
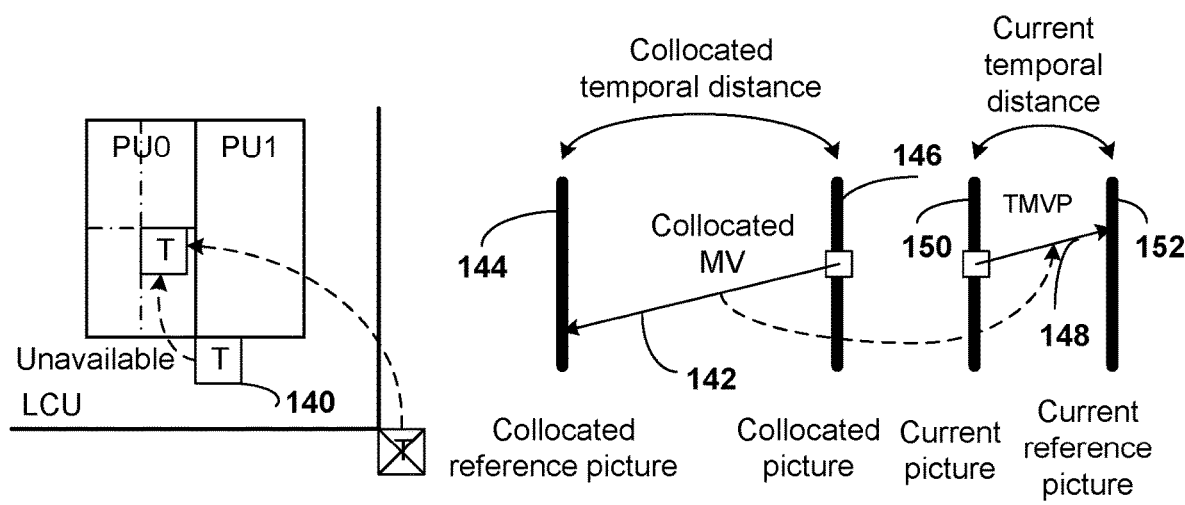
FIG. 3A
FIG. 3B

HISTORY-BASED CANDIDATE LIST WITH CLASSIFICATION

This application claims the benefit of U.S. Provisional Application No. 62/764,851, filed Aug. 16, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to use of history-based candidate lists in generating a candidate list (e.g., merge list or advanced motion vector prediction (AMVP) list). In history-based candidate list construction, a video coder (e.g., video encoder or video decoder) stores motion information of reconstructed blocks (e.g., reconstructed blocks by video decoder or reconstructed blocks reconstructed as part of a decoding loop in a video encoder). The reconstructed blocks need not necessarily be spatially or temporally neighboring blocks. The video coder then generates a candidate list using the history-based candidate list.

This disclosure describes example techniques to selectively include a subset of the candidates from the history-based candidate list into a final candidate list (e.g., final merge or AMVP candidate list) that reduces the chances of redundant candidates in the candidate list. In this manner, there is diversity in the motion information that can be used for determining a motion vector of a current block, which promotes bandwidth efficiency and improves the overall video coding process. The example techniques may be applied to any of the existing and developing video codecs, such as HEVC (High Efficiency Video Coding), VVC (Versatile Video Coding) or be a coding tool corresponding to any other video coding standard.

In one example, the disclosure describes a method of decoding video data, the method comprising constructing a history-based candidate list by storing motion information of reconstructed blocks into the history-based candidate list as candidates of the history-based candidate list, identifying a subset of candidates of the history-based candidate list, generating a candidate list based on the identified subset of candidates of the history-based candidate list, and reconstructing a current block based on the generated candidate list.

In one example, the disclosure describes a device for decoding video data, the device comprising a memory configured to store a history-based candidate list and a processor. The processor is configured to construct the history-based candidate list by storing, in the memory, motion information of reconstructed blocks into the history-based candidate list as candidates of the history-based candidate list, identify a subset of candidates of the history-based candidate list, generate a candidate list based on the identified subset of candidates of the history-based candidate list, and reconstruct a current block based on the generated candidate list.

In one example, the disclosure describes a method of encoding video data, the method comprising constructing a history-based candidate list by storing motion information of reconstructed blocks into the history-based candidate list as candidates of the history-based candidate list, identifying a subset of candidates of the history-based candidate list, generating a candidate list based on the identified subset of candidates of the history-based candidate list, and signaling information indicative of an index into the generated candidate list to identify motion information used to reconstruct a current block.

In one example, the disclosure describes a device for encoding video data, the device comprising a memory configured to store a history-based candidate list and a processor configured to construct the history-based candidate list by storing, in the memory, motion information of reconstructed blocks into the history-based candidate list as candidates of the history-based candidate list, identify a subset of candidates of the history-based candidate list, generate a candidate list based on the identified subset of candidates of the history-based candidate list, and signal information indicative of an index into the generated candidate list to identify motion information used to reconstruct a current block.

The details of one or more examples are set forth in the accompanying drawings and the description below. Other features, objects, and advantages will be apparent from the description and drawings.

BRIEF DESCRIPTION OF DRAWINGS

FIGS. 2A and 2B are conceptual diagrams illustrating examples of spatial neighboring motion vector candidates for merge and advanced motion vector prediction (AMVP) modes, respectively.

FIGS. 3A and 3B are conceptual diagrams illustrating examples of a temporal motion vector predictor (TMVP) candidate and motion vector scaling for TMVP, respectively.

DETAILED DESCRIPTION

Figure 1:
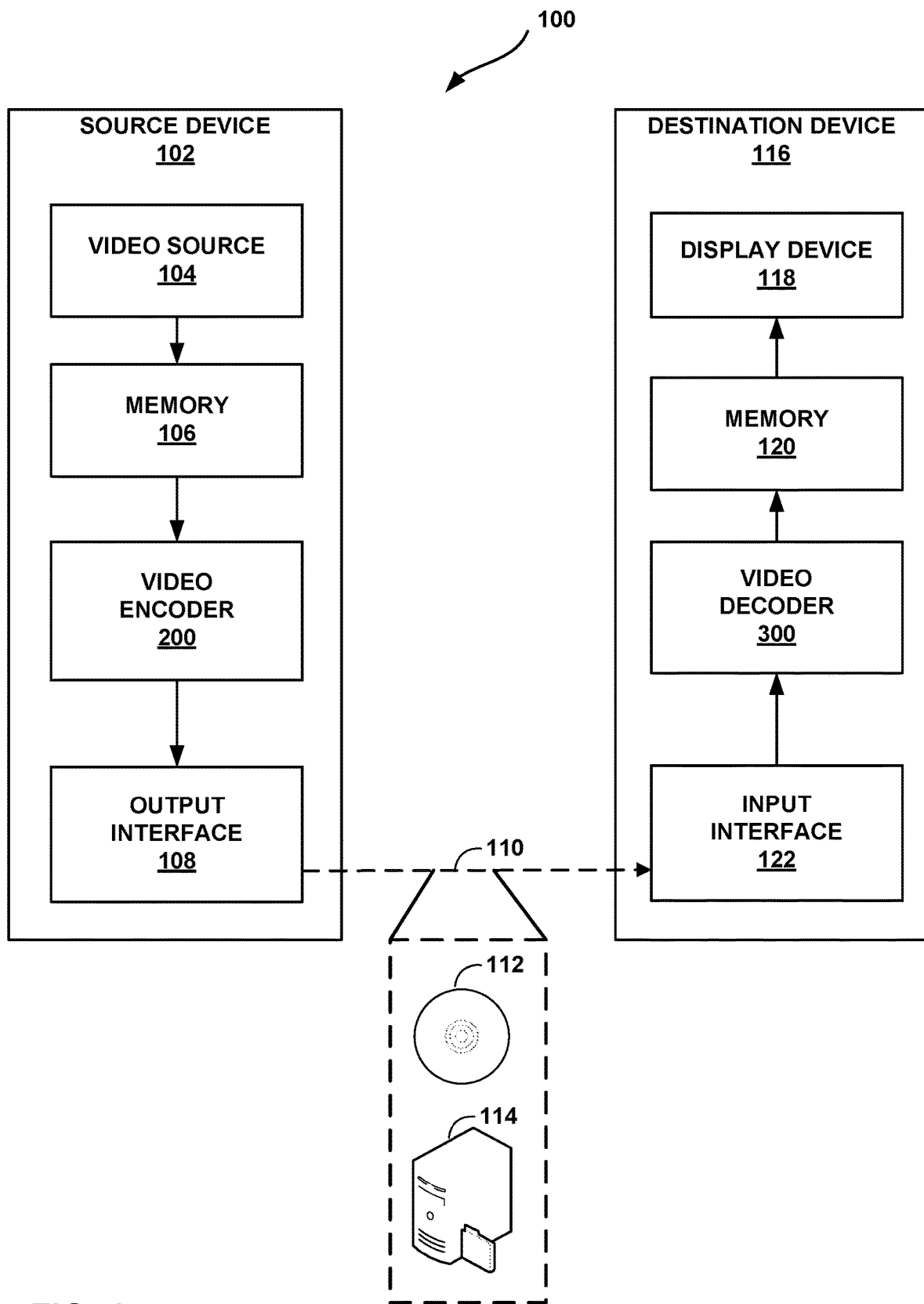
FIG. 1 is a block diagram illustrating an example video encoding and decoding system that may perform the techniques of this disclosure.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a video coding standard, namely High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

An HEVC draft specification, and referred to as HEVC WD hereinafter, is available from http://phenix.int-evry.fr/jct/doc_end_user/documents/14_Vienna/wg11/JCTVC-N1003-v1.zip. The citation for the HEVC standard is: TU-T H.265, Series H: Audiovisual and Multimedia Systems, Infrastructure of audiovisual services—Coding of moving video, Advanced video coding for generic audiovisual services, The International Telecommunication Union. April 2015, 634 pp.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Experts Team (JVET) to evaluate compression technology designs proposed by their experts in this area. The JVET first met during 19-21 Oct. 2015, And the latest version of reference software, i.e., Joint Exploration Model 7 (JEM7) is available, with access required, from: https://jvet.hhi.fraunhofer.de/svn/svn_HMJEMSoftware/tags/HM-16.6-JEM-7.0/. Algorithm description of JEM7 could be referred to as JVET-G1001.

JEM 7 is also referred to ITU-T H.266 or Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v5 (hereinafter "VVC Draft 5"). The techniques of this disclosure, however, are not limited to any particular coding standard.

As described in more detail below, in video coding (e.g., encoding or decoding), a current block is inter-predicted based on a prediction block. For example, a video encoder determines a residual (e.g., difference) between the current block and the prediction block and signals the difference. A video decoder receives the residual and adds the residual to the prediction block to reconstruct the current block.

The video coder (e.g., video encoder or video decoder) identifies the prediction block with a motion vector. In some examples, the video encoder may signal information (e.g., x- and y-values) of the motion vector to the video decoder. However, to reduce the amount of information that is signaled, it may be possible for the video decoder to determine the motion vector for the current block based on motion information of reconstructed blocks. For instance, in merge mode or advanced motion vector prediction (AMVP) mode, a video coder may construct a candidate list of motion information based on motion information of spatially and/or temporally neighboring blocks to the current block. The video encoder signals information indicative of an index into the candidate list, and the video decoder retrieves the motion information from the candidate list based on the index and determines the motion vector for the current block based on the retrieved motion information.

In accordance with one or more examples described in this disclosure, a video coder can construct a history-based candidate list. The history-based candidate list includes motion information of reconstructed blocks, but is not limited to spatially and temporally neighboring blocks of the current block. In some examples, to construct the final candidate list (e.g., final merge or AMVP candidate list), the video coder adds the history-based candidate list to an initial merge or AMVP candidate list.

However, it may be possible to achieve better video coding performance by not simply adding the history-based candidate list to the initial merge or AMVP candidate list. For instance, the size of the candidate list (e.g., merge or AMVP candidate list) may be fixed. Therefore, certain candidates from the history-based list may be dropped if addition of these candidates causes the size of the candidate list to be greater than its fixed size.

However, there is a chance that some of the candidates that are dropped would actually provide a more robust candidate selection for determining the motion vector for the current block. For example, motion information of spatially close blocks may be similar (e.g., a first block and second block that are spatially close, such as neighboring, may have motion vectors that are less than 20% different or may identity the same reference picture, as non-limiting examples). If the history-based list included motion information from two spatially close blocks, then there is a higher probability that the motion information for the two spatially close blocks is similar. If motion information from both of these spatially close blocks is included in the final candidate list, there may not be sufficient diversity in motion information to ensure that the optimal candidate is selected, especially where some of the other candidates from the history-based candidate list are dropped. In other words, there may not be very much, if any, video coding gains by including motion information from both of these spatially close blocks in the final candidate list as compared to including motion information from only one of these spatially close blocks, especially if other candidates from the history-based candidate list are dropped from the final candidate list.

As another example, there is a high probability that the motion information of the most recently reconstructed blocks already exists in the initial candidate list (e.g., in initial merge or AMVP candidate lists before including the history-based candidate list). Therefore, adding motion information from one or more of the most recently reconstructed blocks to generate the candidate list (e.g., generate the final candidate list) may not provide any additional video coding gains, and may negatively impact video coding gains because other possibly better candidates are dropped from the final candidate list.

This disclosure describes one or more example techniques to generate the candidate list (e.g., final merge or AMVP candidate list) by including a subset of the candidates in the history-based candidate list. In some examples, the subset of the candidates in the history-based candidate list include one or more candidates excluding one or more candidates that correspond to recently reconstructed blocks. Recently reconstructed blocks refer to one or more blocks that are immediately reconstructed before the current block being encoded or decoded. In some examples, recently reconstructed blocks are the two blocks that are immediately reconstructed before the current block. The most recently reconstructed block is the block that is immediately reconstructed before the current block. In this way, the techniques may exclude one or more candidate that are likely to already be in the initial candidate list.

In some examples, the subset of candidates in the history-based candidate list include one or more candidates resulting from sub-sampling the history-based candidate list. For instance, every fourth candidate from the history-based candidate list is selected. By sub-sampling the history-based candidate list, motion information of spatially close reconstructed blocks (e.g., reconstructed blocks within three blocks of each other in examples where every fourth candidate is selected) may not get included in the final candidate list. As an example, there are five reconstructed blocks (e.g., first, second, third, fourth, and fifth reconstructed blocks) that are reconstructed in that order. Since, block coding is performed in a raster scan order, the first and second reconstructed blocks may be more proximate to one another than the first and fifth reconstructed blocks. Because the first and second reconstructed blocks are proximate, there is a higher likelihood that the motion information for the first and second reconstructed blocks is similar than the motion information for the first and fifth reconstructed blocks that are not as proximate.

In one or more examples, a video coder may select the motion information for the first and fifth reconstructed block for inclusion in the candidate list (e.g., select every fourth candidate from the history-based candidate list), rather than the first and second reconstructed block. This may be because there is little video coding gain by having motion information for both the first and second reconstructed blocks since the motion information is similar, as compared to ensuring that the motion information for the first and fifth reconstructed blocks is present since the motion information may not be similar. This way there is a diversity of motion information that can be used for identifying the prediction block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such smartphones, televisions, cameras, display devices, digital media players, video gaming consoles, video streaming device, head mounted display (HMD) devices, XR devices (e.g., virtual reality devices, augmented reality devices, and mixed reality devices), or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for constructing a history-based merge or advanced motion vector prediction (AMVP) list. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for constructing a history-based merge list or AMVP list. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

As an example, video encoder 200 and video decoder 300 may be configured to operate according to HEVC. HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of CTUs. Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs). In further examples, video encoder 200 and video decoder 300 may be configured to operate according to any other coding standard, consistent with examples described herein.

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, one example way in which video encoder 200 and video decoder 300 may encode or decode, respectively, is using merge mode or AMVP mode. In both merge and AMVP mode, video encoder 200 and video decoder 300 perform an operation to construct a candidate list (e.g., merge list or AMVP list are two examples of the candidate list). The candidate list includes motion information of spatially or temporally neighboring blocks. For example, the merge list includes motion vector and reference picture list information (e.g., whether RefPicList0 or RefPicList1 is used) for neighboring blocks. The AMVP list includes motion vector and the reference picture list information and a motion vector difference (MVD) is signaled.

Because video encoder 200 and video decoder 300 perform the same operations, the candidate list(s) is the same for video encoder 200 and video decoder 300. Video encoder 200 may identify a candidate from the candidate list and signal information indicative of an index into the candidate list. Video decoder 300 may determine the index into the candidate list and determine the motion information for the current block based on the candidate identified by the index. The motion information includes a motion vector predictor. For merge mode, the motion vector for the current block is set equal to the motion vector predictor. For AMVP mode, video encoder 200 can signal an MVD between the motion vector for the current block and the motion vector predictor. Video decoder 300 adds the MVD to the motion vector predictor to determine the motion vector for the current block.

As described in more detail below, history-based motion vector prediction (HMVP) is now a part of VVC. In HMVP, video encoder 200 and video decoder 300 maintain a history-based candidate list which includes motion information of reconstructed blocks. One example of a reconstructed block is a block reconstructed by video decoder 300. Video encoder 200 includes a reconstruction loop in which video encoder 200 reconstructs an encoded block. Another example of a reconstructed block is a block reconstructed by video encoder 200 as part of the reconstruction (also called decoding) loop. The recently reconstructed blocks need not be limited to spatially or temporally neighboring blocks to the current block.

As part of HMVP, video encoder 200 and video decoder 300 may add the history-based candidate list to generate a candidate list. For example, video encoder 200 and video decoder 300 may generate an initial candidate list (e.g., merge or AMVP list). Then, video encoder 200 and video decoder 300 may add the history-based candidate list to the initial candidate list to generate the final candidate list that is used for merge mode or AMVP mode, as two examples.

However, there may be technical problems if the history-based candidate list were simply added to the initial candidate list. The maximum size of the candidate list may be set. Accordingly, in some cases, adding the history-based candidate list to the initial candidate list would cause the final candidate list to be greater than the maximum size. In such cases, video encoder 200 and video decoder 300 may drop the candidates from the history-based candidate list that cause the final candidate list to be greater than the maximum size.

Dropping of candidates from the history-based candidate list may be undesirable. For example, because spatially neighboring blocks have similar motion information, if two blocks in the history-based candidate list are spatially neighboring, inclusion of motion information for both blocks in the final candidate list would not provide diversity of motion information. However, inclusion of motion information for both blocks in the final candidate list may cause some candidates of the history-based candidate list that do provide diversity of motion information to be dropped.

Also, in some examples, some of the most recent candidates in the history-based candidate list may already be present in the initial candidate list. Accordingly, adding these most recent candidates in the history-based candidate list may not provide any additional benefit.

In accordance with one or more examples described in this disclosure, video encoder 200 and video decoder 300 may be configured to construct a history-based candidate list by storing motion information of reconstructed blocks into the history-based candidate list as candidates of the history-based candidate list, identify a subset of candidates of the history-based candidate list, and generate a candidate list based on the identified subset of candidates of the history-based candidate list. Video encoder 200 may be further configured to signal information indicative of an index into the generated candidate list to identify motion information used to reconstruct a current block. Video decoder 300 may be configured to reconstruct a current block based on the generated candidate list.

In this manner, rather than including the entire of the history-based candidate list, video encoder 200 and video decoder 300 may include a subset of the history-based candidate list. In some examples, the subset may be the result of subsampling the history-based candidate list so that motion information of spatially neighboring blocks in the history-based candidate list is not included the generated candidate list. In some examples, the subset may be the result of excluding motion information of N number of most recently reconstructed blocks. Video encoder 200 and video decoder 300 may be configured to identify the subset of candidates using one or more of subsampling and excluding motion information of N number of most recently reconstructed blocks.

In the above examples, the candidate list that video encoder 200 and video decoder 300 generate may be the final merge list or AMVP list (e.g., video encoder 200 and video decoder 300 add the identified subset of candidates of the history-based candidate list to the initial merge list or AMVP list). In some examples, the candidate list that video encoder 200 and video decoder 300 generate may be the identified subset of candidates (e.g., the identified subset of candidates is not added to the initial merge list or AMVP list but is its own standalone list). In some examples, the techniques described in this disclosure are extended to other types of candidate lists and are not limited to merge and AMVP lists.

The following reviews CU structure and motion vector prediction in HEVC. In HEVC, the largest coding unit in a slice is called a coding tree block (CTB) or coding tree unit (CTU). A CTB contains a quad-tree the nodes of which are coding units.

The size of a CTB can be ranges from 16×16 to 64×64 in the HEVC main profile (although technically 8×8 CTB sizes can be supported). A coding unit (CU) could be the same size of a CTB to as small as 8×8. Each coding unit is coded with one mode, i.e. inter or intra. When a CU is inter coded, it may be further partitioned into 2 or 4 prediction units (PUs) or become just one PU when further partition does not apply. When two PUs are present in one CU, they can be half size rectangles or two rectangle size with ¼ or ¾ size of the CU. When the CU is inter coded, each PU has one set of motion information, which is derived with a unique inter prediction mode.

The following reviews motion vector prediction. In the HEVC standard, there are two inter prediction modes, named merge (skip is considered as a special case of merge) and advanced motion vector prediction (AMVP) modes, respectively, for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list. The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

The following reviews spatial neighboring candidates. In some examples, spatial MV candidates are derived from the neighboring blocks shown in FIGS. 2A and 2B for a specific PU (PU$_0$) 134, although the methods for generating the candidates from the blocks differ for merge and AMVP modes. In merge mode, in some examples, up to four spatial MV candidates can be derived with the orders showed in FIG. 2A with numbers, and the order is the following: left (0, A1), above (1, B1), above right (2, B0), below left (3, A0), and above left (4, B2), as shown in FIG. 2A. For instance, for PU0 134, block A1 is identified as 0 and is left of PU0 134, block B1 is identified as 1 and is above of PU0 134, block B0 is identified as 2 and is above right of PU0 134 and above PU1 136, block A0 is identified as 3 and is below left of PU0 134, and block B2 is identified as 4 and is above left of PU0 134.

In AMVP mode, in some examples, the neighboring blocks are divided into two groups: left group including the block 0 and 1 that are below left and left of PU0 138, respectively, and above group including the blocks 2, 3, and 4 that are above right, above, and above left of PU01 138 as shown in FIG. 2B. Block 2 is above PU1 140. For each group, the potential candidate in a neighboring block referring to the same reference picture as that indicated by the signaled reference index has the highest priority to be chosen to form a final candidate of the group. All neighboring blocks may not contain a motion vector pointing to the same reference picture. Therefore, if such a candidate cannot be found, the first available candidate will be scaled to form the final candidate, thus the temporal distance differences can be compensated.

The following reviews temporal motion vector prediction. In some examples, a temporal motion vector predictor (TMVP) candidate, if enabled and available, is added into the MV candidate list after spatial motion vector candidates. The process of motion vector derivation for TMVP candidate is the same for both merge and AMVP modes, however the target reference index for the TMVP candidate in the merge mode is always set to 0.

In some examples, the primary block location for TMVP candidate derivation is the bottom right block outside of the collocated PU as shown in FIG. 3A as a block T 140, to compensate the bias to the above and left blocks used to generate spatial neighboring candidates. However, if that block is located outside of the current CTB row or motion information is not available, the block is substituted with a center block of the PU.

A motion vector 148 for TMVP candidate in current picture 150 is derived from the collocated PU of the collocated picture 146, indicated in the slice level. The motion vector for the collocated PU is called collocated MV 142. Similar to temporal direct mode in AVC, to derive the TMVP candidate motion vector, the collocated MV 142 may be scaled to compensate for the temporal distance differences, as shown in FIG. 3B. For instance, the temporal difference between collocated picture 146 and collocated reference picture 144 and the temporal difference between current picture 150 and current reference picture 152 is used to scale collocated MV 142 to generate motion vector 148.

The following reviews some other aspects of motion prediction in HEVC. Several aspects of merge and AMVP modes are worth mentioning as follows.

Motion vector scaling: It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete (e.g., fewer candidates than a predetermined number), artificial motion vector candidates are generated and inserted at the end of the list until it will have all candidates. In merge mode, there are two types of artificial MV candidates: a combined candidate derived only for B-slices and zero candidates used only for AMVP if the combined candidate derived only of B-slices does not provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A pruning process is applied to address this problem. It compares one candidate against the others in the current candidate list to avoid inserting identical candidates. To reduce the complexity, a pruning process is applied a limited number of times instead of comparing each potential candidate with all the other existing candidates in the list.

The following describes history-based motion vector prediction. History-based motion vector prediction (HMVP), described in "CE-4 related: History-based motion vector prediction" JVET of ITU-T SG 16 WP 3 and ISO/IEC JTC 1/SC 29/WG 11 11$^{th}$ meeting: Ljubljana, SI, 10-18 Jul. 2018, referred to as JVET-K0104, is a history-based method that allows each block to find its MV predictor from a list of MVs decoded from the past in addition to those in immediately adjacent causal neighboring motion fields. A table with multiple HMVP candidates is maintained during the encoding/decoding process. The table is emptied when a new slice is encountered. Whenever there is an inter-coded block, the associated motion information is inserted to the table in a first-in-first-out (FIFO) fashion as a new HMVP candidate. Then, a constraint FIFO rule can be applied. When inserting a HMVP to the table, redundancy check is applied to find whether there is an identical HMVP in the table. If found, that particular HMVP is removed from the table and all the HMVP candidates afterwards are moved. As described in more detail, in some examples, a redundancy check may not be performed.

HMVP candidates could be used in the merge list construction process. All HMVP candidates from the last entry to the first entry in the table may be inserted after the TMVP candidate. Pruning is applied on the HMVP candidates. Once the total number of available merge candidates reaches the signaled maximally allowed merge candidates, the merge list construction process is terminated.

Similarly, HMVP candidates could also be used in the AMVP candidate list construction process. The motion vectors of the last K HMVP candidates in the table are inserted after the TMVP candidate. In some examples, only HMVP candidates with the same reference picture as the AMVP target reference picture are used to construct the AMVP candidate list. Pruning is applied on the HMVP candidates.

Figure 4:
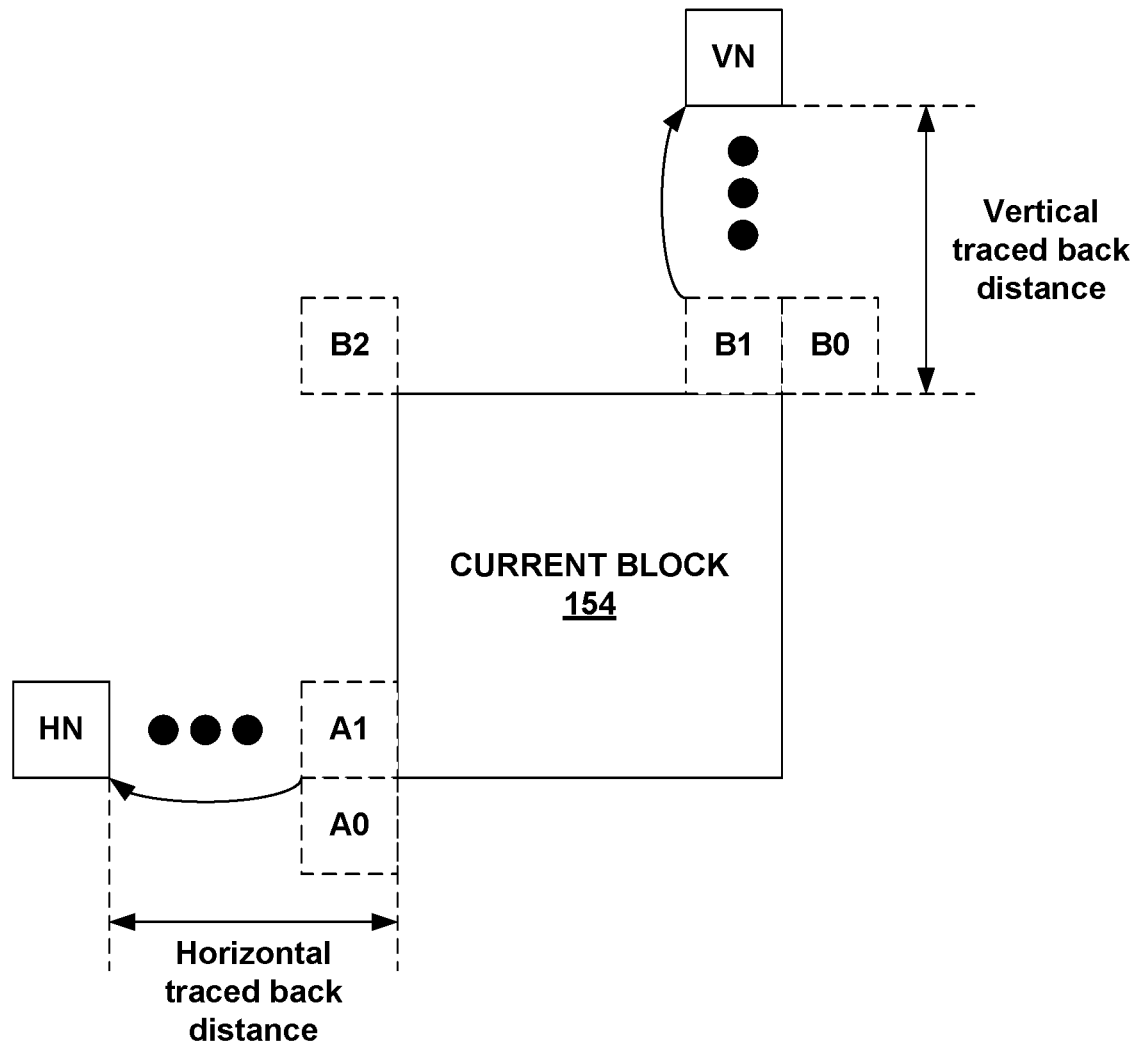
FIG. 4 is a conceptual diagram illustrating examples of fetching non-adjacent spatial merge candidates.

The following describes non-adjacent spatial merge candidates. The construction of non-adjacent spatial merge candidates, described in "CE 4-2.1: Adding non-adjacent spatial merge candidates" JVET of ITU-T SG 16 WP 3 and ISO/IEC JTC 1/SC 29/WG 11 11$^{th}$ meeting: Ljubljana, SI, 10-18 Jul. 2018, referred to as JVET-K0228, involves derivation of new spatial candidates from two non-adjacent neighboring positions (i.e. from the closest non-adjacent block to the left/above, as illustrated in FIG. 4). For instance, FIG. 4 illustrates current block 154 with neighboring blocks A0, A1, B2, B1, and B0. In some examples, the non-adjacent spatial merge candidates include motion information of block HN and block VN of FIG. 4 that are not spatially neighboring current block 154.

The blocks can be limited to being within a maximum distance of 1 CTU to the current block. The fetching process of non-adjacent candidates (e.g., blocks HN and VN) starts with tracing the previous decoded blocks in the vertical direction. The vertical inverse tracing stops when an inter block is encountered or the traced back distance reaches 1 CTU size. The fetching process then traces the previous decoded blocks in the horizontal direction. The criterion for stopping the horizontal fetching process depends on whether there is a vertical non-adjacent candidate successfully being fetched or not. If no vertical non-adjacent candidate is fetched, the horizontal fetching process stops when an inter coded block is encountered or the traced back distance exceed one CTU size threshold. If there is a vertical non-adjacent candidate fetched, then the horizontal fetching process stops when an inter coded block which contains different MV from the vertical non-adjacent candidate is encountered or the traced back distance exceeds a CTU size threshold. The fetched non-adjacent neighboring candidates are added before the TMVP candidate in the merge candidate.

Some techniques may have the following issues, and one or more example techniques may address and overcome the issues. However, there is not a requirement that every example technique necessarily always provide all of the advantages described in this disclosure.

To access non-adjacent merge candidates, the decoder (e.g., video decoder 300) may increase the line buffer size to store these extra motion candidates in addition to adjacent ones. Other approaches alleviate the buffer issue by using a history-based lookup table which stores decoded MVs from the past. Unlike the previous merge candidate approaches, which assign shorter syntaxes to the most probable candidates, these history-based approached just mixed everything into the lookup table without proper classification. Therefore, this disclosure describes example construction methods for history-based merge list or AMVP list that may overcome the above issues. The encoder/decoder (e.g., video encoder 200 or video decoder 300) has the freedom to choose whether a certain candidate list (constructed based on a classification method) is to be used or not.

The following describes example techniques of the disclosure such as construction process of history-based list, pruning process, and construction of synthetic candidates. The example techniques may be used together or separately.

For the construction of history-based candidate list, a history-based candidate list with a short-term (and a long-term) memory is described as one example. Use of short-term and long-term memory is merely one example. The example techniques do not require use of short-term or long-term memory and may utilize one type of memory.

The initial list is constructed and filled with zero motion (e.g., default values) at the beginning when a CTU row, a slice, a tile, a picture, etc. is being encoded/decoded. Which of a CTU row, slice, tile or picture is chosen may depend on the configuration of video encoder 200 and video decoder 300. After a block finishes reconstruction in the encoding/decoding process, the reconstructed blocks motion information (if any) is inserted into the short-term candidate list (i.e. referred to as short-term list) in a first-in-first-out (FIFO) manner. Once the short-term list is full and a new candidate comes, the oldest one is pulled out and the latest one is pushed into the short-term list. Then, the one pulled out from the short-term list is inserted into the FIFO-based long-term candidate list (i.e. referred to as long-term list).

In the above example, a short-term and long-term list is described. However, in some examples, there may be a single candidate list (e.g., single history-based candidate list), and motion information of reconstructed blocks is added to the history-based candidate list in a FIFO manner.

The size of both lists is configurable, with $N_S$ and $N_L$ for the short- and long-term list, respectively. In some examples, the size of the single history-based candidate list is configurable. The codec (e.g., video encoder 200 and/or video decoder 300) has the flexibility to choose either one of the two lists (or a combination of them) to form the final merge list in addition to or in replace of the original merge list. For example, candidates in either one or both of the short-term and long-term lists can be inserted into the final merge list. In some examples where both short-term and long-term lists are used, but only one is populated, the list that is populated may be considered as a single history-based candidate list. In other words, in some examples, the short-term list may be considered as one example of the history-based candidate list and the long-term list may be considered as one example of the history-based candidate list. In some examples, it may not be necessary for there to be both a short-term list and a long-term list, in which case, the one of the short-term list or the long-term list becomes a single history-based candidate list.

The following is examples of four insertion orders:
only the short-term candidates are inserted into the final merge list (e.g., the short-term candidates are the history-based candidate list);
only the long-term candidates are inserted into the final merge list (e.g., the short-term candidates are the history-based candidate list);
the short-term candidates are inserted into the final merge list first before long-terms ones sequentially;
the short- and long-term candidates are inserted into the final merge list in an interleaving manner, where the insertion order is $1^{st}$ short-term candidate, long-term candidate, $2^{nd}$ short-term candidate, $2^{nd}$ long-term candidate, and so on.

The following describes time-delayed short-term list techniques. The example techniques may be applied generally where there is a history-based candidate list (e.g., short-term list, long-term list, or single list that is not separated into short-term and long-term, such as where there is only one of a short-term or a long-term list). A variable history-based candidate list (e.g., short-term list) is proposed with a time-delay feature. In the above example, the history-based candidate list is updated every time when an inter block finishes encoding/decoding. In one example, the disclosure describes example techniques that introduce a time-delay factor, $T_S$ (where $T_S<N_S$), that the first $T_S$ candidate in the history-based candidate list (e.g., which may be the short-term list, single history-based candidate list, or a long-term list) is temporarily set unavailable. The delay may avoid confliction with spatial MV prediction (if any) which takes the motion information from immediately neighboring motion field as merge candidates. For example, when encoding/decoding a block D 162 in FIG. 5, $T_S$ can be 1 so that motion information of block C 160 in the short-term list is temporarily marked as unavailable, so it (e.g., block C 160) will not be inserted into the final merge list. Similarly, in other examples such as $T_S=2$ (or $T_S=3$), motion information of both block B 158 and block C 160 (or motion information of all of block A 156, block B 158 and block C 160) in the short-term list will not be inserted into the final merge list.

Figure 5:
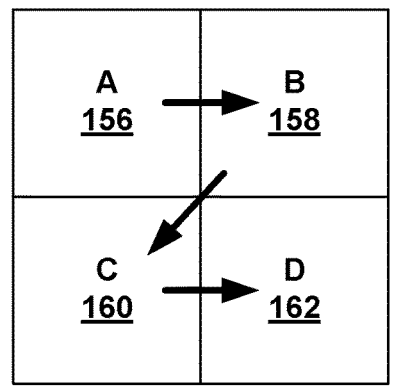
FIG. 5 is a conceptual diagram illustrating examples of a coding unit (CU) partitioning in a coding tree unit (CTU), where the coding order is A→B→C→D.

For example, video encoder 200 and video decoder 300 may be configured to identify a first subset of one or more candidates of the history-based candidate list corresponding to motion information of recently reconstructed blocks. As an example, the history-based candidate list may include motion information for blocks A 156, B 158, and C 160. In the example of FIG. 5, block C 160 is the most recently reconstructed block (e.g., the block reconstructed immediately before block D 162), block B 158 is the block reconstructed before block C 160, and block A 156 is the block reconstructed before block B 158. In this example, video encoder 200 and video decoder 300 may identify a first subset that includes one or more of blocks A 156, B 158, and C 160. Block D 162 may be the block being coded.

As one example, video encoder 200 and video decoder 300 may identify two candidates of the history-based candidate list corresponding to motion information of two most recently reconstructed blocks. For instance, the history-based candidate list included motion information of blocks A 156, B 158, and C 160, of which, blocks B 158 and C 160 are the two most recently reconstructed block. In this example, video encoder 200 and video decoder 300 may identify blocks B 158 and C 160 as a first subset of the one or more candidates of the history-based candidate list.

Video encoder 200 and video decoder 300 may identify a second subset of one or more candidates of the history-based candidate list that excludes the first subset. As one example, the second subset of one or more candidates of the history-based candidate list includes block A 156 because the first subset, which includes blocks B 158 and C 160, are excluded.

As described above, video encoder 200 and video decoder 300 may identify a subset of candidates of the history-based candidate list. In the above example, video encoder 200 and video decoder 300 may identify the second subset of the one or more candidates of the history-based candidate list. For instance, video encoder 200 and video decoder 300 may identify the motion information of block A 156. Video encoder 200 and video decoder 300 may generate a candidate list based on the motion information of block A 156 (e.g., add the motion information of block A 156 to the initial merge or AMVP list).

One example of a potential benefit of identifying a first subset of one or more candidates of the history-based candidate list corresponding to motion information of recently reconstructed blocks is that motion information of recently reconstructed blocks may already be part of the initial merge or AMVP list. Therefore, by excluding the first subset of one or more candidates of the history-based candidate list from the second subset, there is a higher likelihood that the candidates in the second subset are not duplicates of candidates that are already in the merge or AMVP list.

The following describes a sub-sampled candidate list. The history-based candidate list can be formed at a lower sampling rate on the causal motion fields. Three example techniques are described: a list-subsampling approach, a block-subsampling approach and a region-subsampling approach. Both or all may share the common ground to prevent the encoder/decoder from sampling every coded/decoded motion information from the bitstream to form the final candidate list (e.g., final merge or AMVP list), because MVs that are spatially close to each other may be similar (or even identical). A subsampling rate, R, may be specified for one or more of the examples.

Similar to above, video encoder 200 and video decoder 300 may construct a history-based candidate list by storing motion information of reconstructed blocks into the history-based candidate list as candidates of the history-based candidate list and identify a subset of candidates of the history-based candidate list. In one or more examples, to identify the subset of candidates of the history-based candidate list, video encoder 200 and video decoder 300 may sub-sample the history-based candidate list to identify the subset of candidates.

As one example, video encoder 200 and video decoder 300 may perform a list-sub-sampling approach. Video encoder 200 and video decoder 300 may update the history-based candidate list (e.g., the short-term list, the long-term list, or the single history-based candidate list) by inserting each newly decoded/encoded motion information into the history-based candidate list. However, in some examples, video encoder 200 and video decoder 300 may periodically sub-sample only the first or last one from every R candidates in the history-based candidate list and mark the sub-sampled candidates as available to be inserted into the candidate list (e.g., final merge or AMVP list).

These available candidates can be identified from these index positions {0, R, 2R, . . . } ({1, R+1, 2R+1, . . . } {2, R+2, 2R+3, . . . } or {R−1, 2R−1, 3R−1 . . . }) in the history-based candidate list. For example, when $N_S$=16 and R=4, these index positions may be {0, 4, 8, 12} (or {3, 7, 11, 15}).

For instance, the history-based candidate list may include 16 candidates. Each of the 16 candidates represents the 16 most recently reconstructed blocks and includes respective motion information (if any) for the 16 most recently reconstructed blocks. Candidates in the history-based candidate list may be identified by an index value (e.g., index 0 is for the first entry in the history-based candidate list and index 15 is for the last entry in the history-based candidate list). In some examples, index 0 is for the most recently reconstructed block and index 15 is for the earliest reconstructed block (e.g., least recently reconstructed block). In other words, index 0 is for the most recently added candidate in the history-based candidate list and index 15 is for the earliest added candidate in the history-based candidate list.

In some examples, video encoder 200 and video decoder 300 may identify every Nth candidate in the history-based candidate list as a way to sub-sample the history-based candidate list to identify a subset of candidates. As one example, video encoder 200 and video decoder 300 may identify every fourth candidate in the history-based candidate list.

Also, video encoder 200 and video decoder 300 may identify every Nth candidate starting from the beginning of the history-based candidate list or starting from the ending of the history-based candidate list. For instance, assume N is equal 4, if starting from the beginning of the history-based candidate list, video encoder 200 and video decoder 300 may identify the candidates in the history-based candidate list indexed by index value 0, 4, 8, 12. For example, when N is equal 4, if starting form the ending of the history-based candidate list, video encoder 200 and video decoder 300 may identity the candidates in the history-based candidate list indexed by index value 15, 11, 7, 3.

In the example where video encoder 200 and video decoder 300 start with the ending of the history-based candidate list, index value 15 refers to the earliest added candidate in the history-based candidate list. Accordingly, in some examples, video encoder 200 and video decoder 300 may sub-sample the history-based candidate list starting from an earliest added candidate in the history-based candidate list. However, the example techniques are not so limited. In some examples, video encoder 200 and video decoder 300 may sub-sample the history-based candidate list starting from a latest added candidate in the history-based candidate list.

A list sub-sample approach, as described above, is one example way in which to sub-sample the history-based candidate list. As another example, video encoder 200 and video decoder 300 may utilize a block sub-sampling approach. In the block sub-sampling approach, the history-based candidate list (e.g., short-term list) is updated once by inserting the first (or last) motion information into the history-based candidate list from every R pieces of newly decoded/encoded motion information. As another example, video encoder 200 and video decoder 300 may utilize a region sub-sampling approach. In the region sub-sampling approach, the history-based candidate list (e.g., the short-term list) is updated once only after the accumulated number of encoded/decoded pixels exceeds R after previous update of the history-based candidate list. When the update process is invoked, the accumulated number of pixels is then subtracted by R.

As described above, video encoder 200 and video decoder 300 may employ at least two techniques to identify a subset of candidates of the history-based candidate list. In a first technique, video encoder 200 and video decoder 300 may exclude candidates corresponding to motion information of recently reconstructed blocks. In a second technique, video encoder 200 and video decoder 300 may sub-sample the history-based candidate list (e.g., using list-based approach, block-based approach, or region-bases approach).

In some examples, video encoder 200 and video decoder 300 may combine the first and second techniques. For instance, video encoder 200 and video decoder 300 may identify a first subset of one or more candidates of the history-based candidate list corresponding to motion information of recently reconstructed blocks. As one example, to identify the first subset, video encoder 200 and video decoder 300 may identify two candidates of the history-based candidate list corresponding to motion information of two most recently reconstructed blocks (e.g., candidates identified by index values 0 and 1).

Video encoder 200 and video decoder 300 may then identify a second subset of one or more candidates of the history-based candidate list that excludes the first subset (e.g., candidates identified by index values 2-15). Video encoder 200 and video decoder 300 may identify a subset of candidates from the history-based candidate list by sub-sampling the second subset. As one example, video encoder 200 and video decoder 300 may sub-sample the history-based candidate list (e.g., identify every fourth candidate in the history-based candidate list) but not include candidates from the first subset (e.g., candidates identified by index values 0 and 1).

Using the above example techniques (e.g., a first technique of excluding candidates corresponding to motion information of recently reconstructed blocks, a second technique of sub-sampling, or a combination thereof), video encoder 200 and video decoder 300 may identify a subset of candidates of the history-based candidate list. Video encoder 200 and video decoder 300 may generate a candidate list (e.g., final merge list or AMVP list) based on the identified subset of candidates of the history-based candidate list. For instance, video encoder 200 and video decoder 300 may add one or more candidates from the identified subset of candidates to an initial merge or AMVP list to generate the final merge or AMVP list.

In this way, the candidate list (e.g., final merge or AMVP list) includes candidates that provide a diverse selection of motion information (e.g., motion information that is not similar as other motion information in the candidate list). Again, as described above, spatially neighboring blocks tend to have similar motion information. By sub-sampling and excluding motion information for certain blocks, the subset of candidates of the history-based candidate list may include motion information from non-spatially neighboring blocks, which increases the diversity in the motion information (e.g., motion information for one block that is not the same as motion information for another block).

Having a diversity in the motion information allows video encoder 200 to select an index in the candidate list that is likely to reduce signaling bandwidth relative to situations where there is not much diversity in the motion information in the candidate list. For instance, for merge mode, video encoder 200 may be able to select motion information for the current block that ensures that the prediction block that is identified by the motion information minimizes the residual between the prediction block and the current block. Without having such diversity in the motion information, the candidate list may not include motion information that would minimize the residual.

The following describes a constrained candidate list. The history-based candidate list can be updated by using the motion information from blocks coded by a prediction mode pre-defined in a constraint set. Due to the motion characteristics in video sequences, sometimes certain inter prediction modes would be more efficient than others to represent the motion field. For example, spatial MV candidates would be less reliable than temporal ones when object occlusion occurs. Accordingly, this disclosure describes techniques that may offer the flexibility for the encoder/decoder to update a history-based candidate list (e.g., short-term or long-term list) when the inserted motion information is from a block coded by using one of the pre-defined prediction modes. For example, if the constraint set is specified with spatial-temporal motion vector prediction (STMVP) and TMVP modes, only the motion information derived from STMVP and TMVP may be used to update the history-based candidate list (e.g., short-term list or long-term list).

The following describes interleaved candidate storage. Each coming new candidate can be pushed into the history-based candidate list in an interleaving manner. Three example techniques are described below. The encoder (e.g., video encoder 200) has the freedom to choose which of the following methods is to be applied, and the decoder (e.g., video decoder 300) may just follow the same way as the encoder does.

Figure 6:
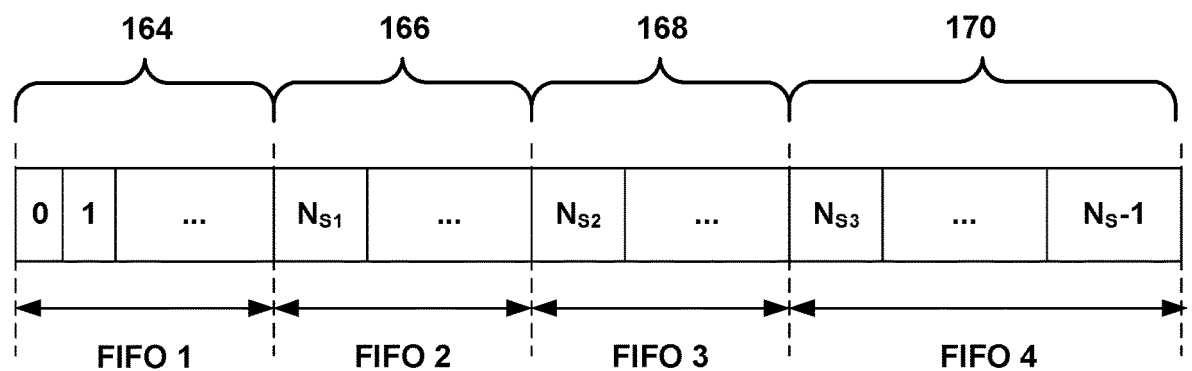
FIG. 6 is a conceptual diagram illustrating examples of splitting a list into independent first-in-first-out (FIFO) lists.

A.) Merge mode based approach: Depending on the number of maximally supported types of merge modes in the codec, the history-based candidate list described above can be split into multiple sub-lists. For example, the JEM software supports spatial AMVP, temporal AMVP, alternative temporal motion vector prediction (ATMVP), and STMVP. Thus, the short-term list and long-term list can be both split into 4 groups, as illustrated in FIG. 6. For instance, first-in-first-out (FIFO) 1 includes index ranges of [0, $N_{S1}$), represented by reference numeral 164. FIFO 2 includes index ranges of [$N_{S1}$, $N_{S2}$), represented by reference numeral 166. FIFO 3 includes index ranges of [$N_{S2}$, $N_{S3}$), represented by reference numeral 168. FIFO 4 includes index ranges of [$N_{S3}$, $N_S$), represented by reference numeral 170. FIFO 1-FIFO 4 including index ranges 164-170, form the short-term list and are assigned to the 4 modes, respectively. Similarly, [0, $N_{L1}$), [$N_{L1}$, $N_{L2}$), [$N_{L2}$, $N_{L3}$), [$N_{L3}$, $N_L$) in the long-term list are assigned to the 4 modes, respectively. As illustrated, each sub-list is an independent FIFO list (e.g., FIFO 1 to FIFO 4 for the short-term list where first sub-list includes index range 164, second sub-list includes index range 166, third sub-list includes index range 168, and fourth sub-list includes index range 170). Whichever sub-list is updated does not affect other lists. After an inter block is encoded/decoded, its motion information is pushed into one of the FIFO list depending on its motion prediction mode (e.g. spatial AMVP, temporal AMVP, ATMVP and STMVP).

When a candidate in a sub-list of the short-term list is pulled out, it is then pushed into the corresponding sub-list of the long-term list. For example, if a candidate is pulled out from FIFO 1 in the short-term list, then it is pushed into the long-term list at FIFO 1.

B.) Block size based approach: Instead of or in addition to Method A: Merge mode based approach, this example allows to split the history-based candidate list into several FIFO sub-lists based on the number of pixels, $N_P$, in a block. This example pre-defines a series of $N_P$ in ascending order to determine how each block is associated with a FIFO sub-list. For example, this example can split the history-based candidate list into 4 FIFO sub-lists (FIG. 6), so the value of $N_P$ series can be pre-defined such as {64, 128, 256}, and {$N_{S1}$, $N_{S2}$, $N_{S3}$} and {$N_{L1}$, $N_{L2}$, $N_{L3}$} can also be required to be pre-defined. In this example, the motion information of a decoded/encoded block is pushed into FIFO 1, 2, or 3 if the number of pixels in a block does not exceed 64, 128, or 256 pixels, and the rest is inserted into FIFO 4.

C.) MV based approach: Similar to Method B: Block size based approach, the sub-list mapping can be based on block MV instead of block pixel count. For example, this example can take the sign bit of x and y components of an encoded/decoded block MV as reference to map the block motion information into a FIFO sub-list. Like FIG. 6, this example can split the history-based candidate list into 4 sub-lists with a mapping function of $(MVx<0?1:2)*(MVy<0?1:2)$ for uni-prediction or $(MVx^{(L0)}*MVx^{(L1)}<0?1:2)*(MVy^{(L0)}*MVy^{(L1)}<0?1:2)$ for bi-prediction. When the function output is 1, 2, 3, or 4, FIFO 1, 2, 3, or 4 is assigned to the block.

This mapping function can be pre-defined by anything that can produce the same number of outputs as the number of sub-lists. For example, the history-based candidate list (e.g. short-term and long-term lists or a single history-based candidate list) can be split into 2 sub-lists (e.g. FIFO 1 ranging from 0 to $N_{S1}-1$ and FIFO 2 ranging from $N_{S1}$ to $N_S$), and the mapping function can be defined as $(MVx+MVy<0?1:2)$ for uni-prediction or $(MVx^{(L0)}+MVx^{(L1)}+MVy^{(L0)}+MVy^{(L1)}<0?1:2)$ for bi-prediction.

The following describes candidate pruning process, starting with responsive pruning process. Before a new piece of motion information is inserted into the short-term list, a pruning process begins to check whether any motion information stored in the short-term list is identical to the new piece of motion information. If no, this new piece of motion information is inserted into the short-term list in the same first-in-first-out manner as described above. Otherwise, the repeated piece of motion information in the short-term list is removed first, and then the new piece of motion information can be added into the short-term list. It is noted that the example techniques may also apply the same pruning process to the long-term list.

The following describes time-delayed pruning process. A low-complexity pruning process to the history-based candidate list (e.g., short-term list, long-term list, or a single history-based candidate list) is described with a time-delayed feature. With the time-delay feature, the pruning process is not invoked every time when a new piece of motion information is added into the history-based candidate list. Instead, the pruning process is invoked once for every R pieces of newly decoded/encoded motion information inserted into the history-based candidate list, where R is a positive integer. Thus, this approach may effectively reduce the complexity of the pruning process to some extent at the cost of losing the compactness of the history-based candidate list. An extreme case is that the pruning process is never invoked during the encoding and decoding processes when R approaches to infinity. It is noted that the encoder/decoder has the flexibility to choose whether this time-delayed approach can be applied to the history-based candidate list or not.

For example, as video encoder 200 and video decoder 300 are constructing the history-based candidate list, video encoder 200 and video decoder 300 may not determine whether motion information of any of the candidates in the history-based candidate list is duplicate and may not remove candidates that are duplicate. In other words, video encoder 200 and video decoder 300 may construct the history-based candidate list without pruning the history-based candidate list.

One example reason why video encoder 200 and video decoder 300 may not prune the history-based candidate list is due to the sub-sampling and the exclusion of certain candidates (e.g., two most recently reconstructed blocks). As described above, the sub-sampling and exclusion of certain candidates provides a relatively high likelihood that duplicate or similar motion information is removed from the history-based candidate list. Therefore, performing the pruning operation on the history-based candidate list may not provide much benefit, especially with sub-sampling and exclusion of certain candidates, but may cost processing time.

Although, in some examples, video encoder 200 and video decoder 300 may not perform pruning on the history-based candidate list, video encoder 200 and video decoder 300 may perform a pruning operation on the final candidate list. For instance, video encoder 200 and video decoder 300 may generate a candidate list based on the identified subset of candidates of the history-based candidate list. Then, video encoder 200 and video decoder 300 may prune the candidate list.

The following describes construction of synthesis candidates. The history-based candidate list is not always filled with motions sampled from the actual motion fields at the beginning cycles when a CTU row, a slice, a tile, or a picture is being encoded/decoded. As mentioned above, every vacant candidate position is filled by using a default value, that is, zero motion. As instead, a synthetic set of bi-prediction motion pairs is introduced for B slices. Each motion pair is formed by taking reference from two available candidates in the history-based candidate list, where the L0 and L1 motion vectors in a motion pair is from the L0 motion vector of the first available candidate and the L1 motion vector is from the L1 motion vector of the second available candidate, respectively. Supposing the number of available candidates in the history-based candidate list is M, an ordered sequences of candidate indices from history-based candidate list is defined as follows to form the motion pairs.

$$\cup_{0<m<M}\{(0,m),(m,0),(1,m),(m,1),(2,m),(m,2),\ldots,(m-1,m),(m,m-1)\}$$

For example, when M=4, the ordered indices sequence is {(0,1), (1,0)}∪{(0,2), (2,0), (1,2), (2,1)}∪{(0,3), (3,0), (1,3), (3,1), (2,3), (3,2)}. These motion pairs are inserted into the final merge list sequentially as a replacement to the filled zero motion in the history-based candidate list until the final merge list is full. Then, the remaining vacant candidate positions in the final merge list is filled by using zero motion and the first reference picture in each reference list.

Figure 7:
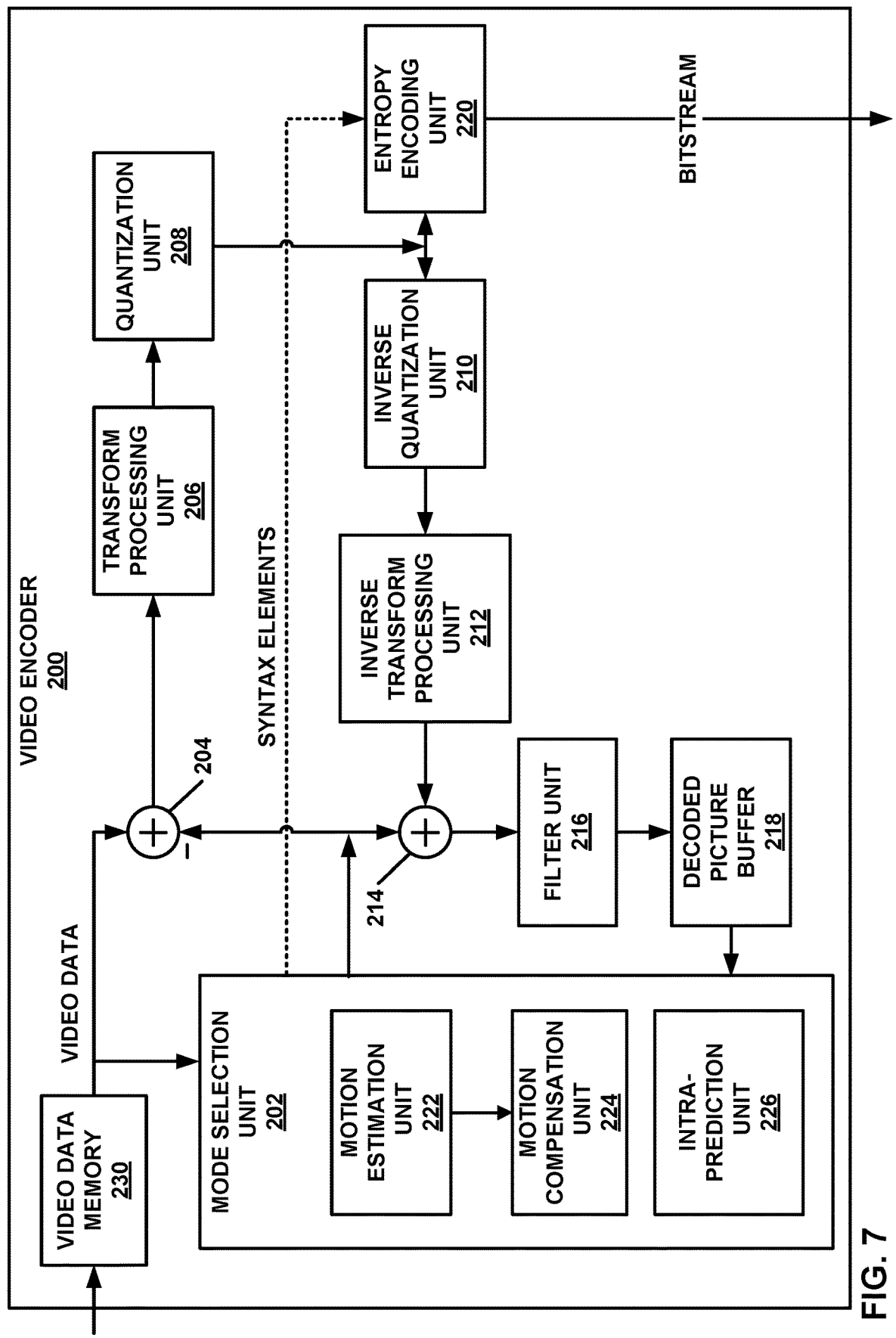
FIG. 7 is a block diagram illustrating an example video encoder that may perform the techniques of this disclosure.

FIG. 7 is a block diagram illustrating an example video encoder 200 that may perform the techniques of this disclosure. FIG. 7 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard (e.g. VVC) in development. However, the techniques of this disclosure are not limited to these video coding standards, and are applicable generally to video encoding and decoding.

In the example of FIG. 7, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 7 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in fixed-function and/or programmable circuitry and configured to perform the example techniques described in this disclosure. For example, mode selection unit 202 may construct a history-based candidate list by storing motion information of reconstructed blocks (e.g., motion vector information for AMVP and motion vector information and reference picture to which the motion vector points for merge mode) into the history-based candidate list as candidates of the history-based candidate list. Video data memory 230 may store a history-based candidate list, and mode selection unit 202 may add motion information of a reconstructed block stored in DPB 218 in the history-based candidate list. In some examples, mode selection unit 202 may construct the history-based candidate list without pruning the history-based candidate list.

Mode selection unit 202 may be configured to identify a subset of candidates of the history-based candidate list. There may be various ways in which mode selection unit 202 identifies a subset of candidates of the history-based candidate list. As a first example technique for identifying a subset of candidates of the history-based candidate list, mode selection unit 202 identifies a first subset of one or more candidates of the history-based candidate list corresponding to motion information of recently reconstructed blocks (e.g., two most recently reconstructed blocks). Mode selection unit 202 identifies a second subset of one or more candidates of the history-based candidate list that excludes the first subset. For example, the second subset includes the motion information of the remaining reconstructed blocks in the history-based candidate list excluding the motion information of the two most recently reconstructed blocks. In this example, mode selection unit 202 identifies the second subset of the one or more candidates of the history-based candidate list as the subset of the history-based candidate list.

As a second example technique for identifying a subset of candidates of the history-based candidate list, mode selection unit 202 sub-samples the history-based candidate list to identify the subset of candidates. As one example, mode selection unit 202 identifies every fourth candidate in the history-based candidate list. As one example, mode selection unit 202 sub-samples starting from an earliest added candidate in the history-based candidate list.

As a third example technique for identifying a subset of candidates of the history-based candidate list, mode selection unit 202 may perform a combination of the first and second example techniques. For instance, mode selection unit 202 identifies a first subset of one or more candidates of the history-based candidate list corresponding to motion information of recently reconstructed blocks and identifies a second subset of one or more candidates of the history-based candidate list that excludes the first subset. To identify the subset of candidates of the history-based candidate list, mode selection unit 202 sub-samples the second subset. As one example, mode selection unit 202 sub-samples the history-candidate list but excludes the first subset. As another example, mode selection unit 202 sub-samples just the second subset.

Mode selection unit 202 may generate a candidate list based on the identified subset of candidates of the history-based candidate list. For instance, mode selection unit 202 may add the identified subset of candidates to an initial merge list or AMVP list to generate a final merge or AMVP list. As another example, the identified subset of candidates may form as its own independent indexable list (e.g., does not need to be added to a merge or AMVP list).

Mode selection unit 202 may signal information indicative of an index into the generated candidate list to identify motion information unit to reconstruct the current block. For example, video decoder 300 may perform similar operations to generate a candidate list. Video decoder 300 may determine the index from the signaled information and determine the motion information identified by the index. Video decoder 300 may utilize the motion information to determine a motion vector for the current block and reconstruct the current block using the determined motion vector. For instance, video decoder 300 may determine a prediction block based on the determined motion vector.

Video encoder 200 may also signal information indicative of a residual between a prediction block identified based on the motion information used to reconstruct the current block. Video decoder 300 may add the residual to the prediction block to reconstruct the current block.

Figure 8:
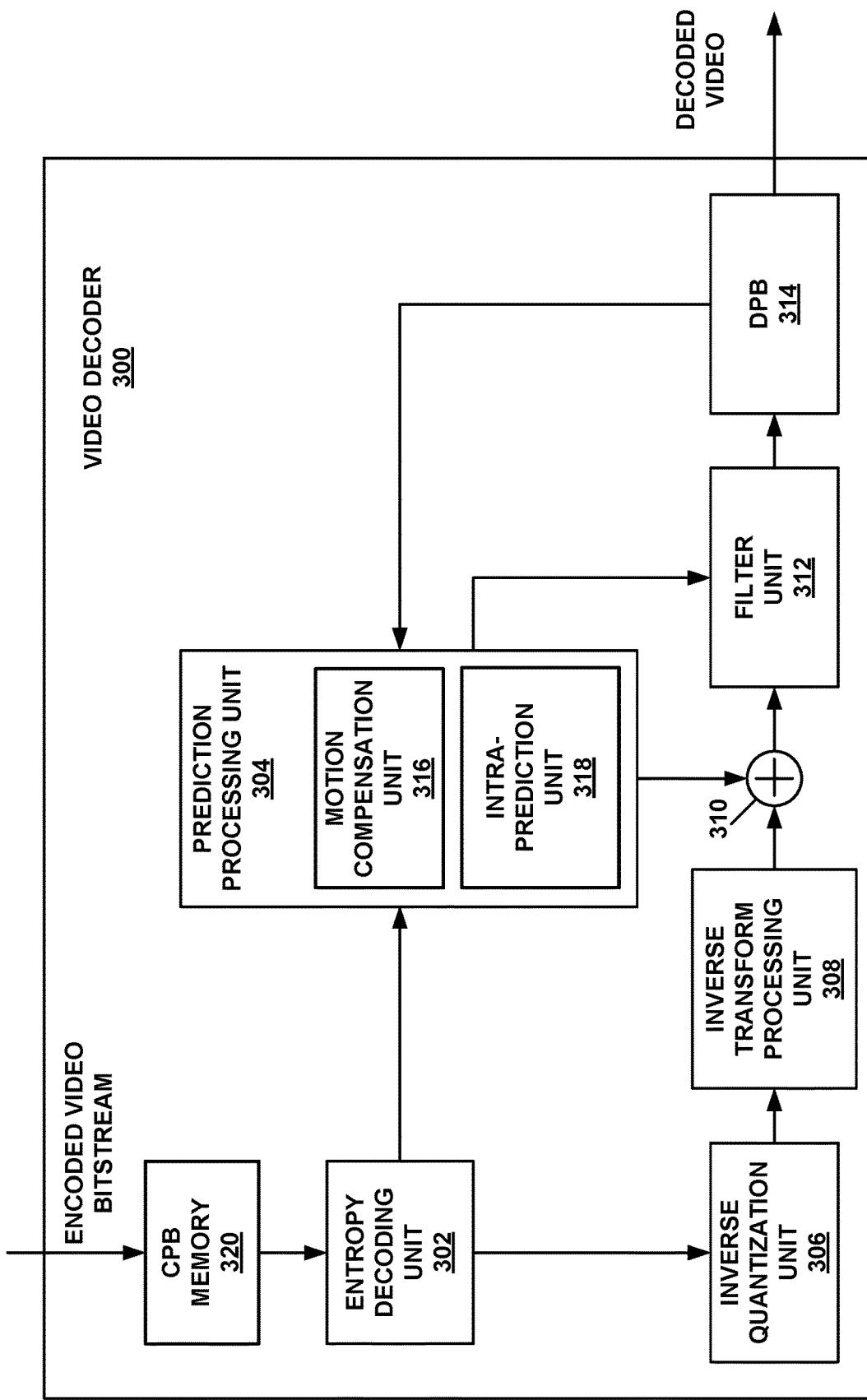
FIG. 8 is a block diagram illustrating an example video decoder that may perform the techniques of this disclosure.

FIG. 8 is a block diagram illustrating an example video decoder 300 that may perform the techniques of this disclosure. FIG. 8 is provided for purposes of explanation and is not limiting on the techniques as broadly exemplified and described in this disclosure. For purposes of explanation, this disclosure describes video decoder 300 is described according to the techniques of JEM, including VVC, and HEVC. However, the techniques of this disclosure may be performed by video coding devices that are configured to other video coding standards.

In the example of FIG. 8, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 8 are illustrated to assist with understanding the operations performed by video decoder 300. The units may be implemented as fixed-function circuits, programmable circuits, or a combination thereof. Similar to FIG. 7, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 7).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 7). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in fixed-function and/or programmable circuitry and configured to perform the example techniques described in this disclosure. For example, prediction processing unit 304 may construct a history-based candidate list by storing motion information of reconstructed blocks (e.g., motion vector information for AMVP and motion vector information and reference picture to which the motion vector points for merge mode) into the history-based candidate list as candidates of the history-based candidate list. DPB 314 (or possibly some other memory) may store a history-based candidate list, and prediction processing unit 304 may add motion information of a reconstructed block stored in DPB 314 in the history-based candidate list. In some examples, prediction processing unit 304 may construct the history-based candidate list without pruning the history-based candidate list.

Prediction processing unit 304 may be configured to identify a subset of candidates of the history-based candidate list. There may be various ways in which prediction processing unit 304 identifies a subset of candidates of the history-based candidate list. As a first example technique for identifying a subset of candidates of the history-based candidate list, prediction processing unit 304 identifies a first subset of one or more candidates of the history-based candidate list corresponding to motion information of recently reconstructed blocks (e.g., two most recently reconstructed blocks). Prediction processing unit 304 identifies a second subset of one or more candidates of the history-based candidate list that excludes the first subset. For example, the second subset includes the motion information of the remaining reconstructed blocks in the history-based candidate list excluding the motion information of the two most recently reconstructed blocks. In this example, prediction processing unit 304 identifies the second subset of the one or more candidates of the history-based candidate list as the subset of the history-based candidate list.

As a second example technique for identifying a subset of candidates of the history-based candidate list, prediction processing unit 304 sub-samples the history-based candidate list to identify the subset of candidates. As one example, prediction processing unit 304 identifies every fourth candidate in the history-based candidate list. As one example, prediction processing unit 304 sub-samples starting from an earliest added candidate in the history-based candidate list.

As a third example technique for identifying a subset of candidates of the history-based candidate list, prediction processing unit 304 may perform a combination of the first and second example techniques. For instance, prediction processing unit 304 identifies a first subset of one or more candidates of the history-based candidate list corresponding to motion information of recently reconstructed blocks and identifies a second subset of one or more candidates of the history-based candidate list that excludes the first subset. To identify the subset of candidates of the history-based candidate list, prediction processing unit 304 sub-samples the second subset. As one example, prediction processing unit 304 sub-samples the history-candidate list but excludes the first subset. As another example, prediction processing unit 304 sub-samples just the second subset.

Prediction processing unit 304 may generate a candidate list based on the identified subset of candidates of the history-based candidate list. For instance, prediction processing unit 304 may add the identified subset of candidates to an initial merge list or AMVP list to generate a final merge or AMVP list. As another example, the identified subset of candidates may form as its own independent indexable list (e.g., does not need to be added to a merge or AMVP list).

Prediction processing unit 304 may reconstruct a current block based on the generated candidate list. For example, prediction processing unit 304 may receive information indicative of an index into the generated candidate list and determine motion information for the current block based on motion information stored in the generated candidate list identified by the index into the generated candidate list. For example, in merge mode, prediction processing unit 304 may set the motion vector of the motion information stored in the generated candidate list as the motion vector for the current block. In AMVP mode, prediction processing unit 304 may receive a motion vector difference (MVD) and add the MVD to the motion vector of the motion information stored in the generated candidate list to determine the motion vector for the current block. Prediction processing unit 304 may determine a prediction block based on the determined motion information.

In addition, prediction processing unit 304 may receive information indicative of a residual between the prediction block and the current block. Reconstruction unit 310 may reconstruct the current block based on the residual and the prediction block (e.g., add the residual to the prediction block).

Figure 9:
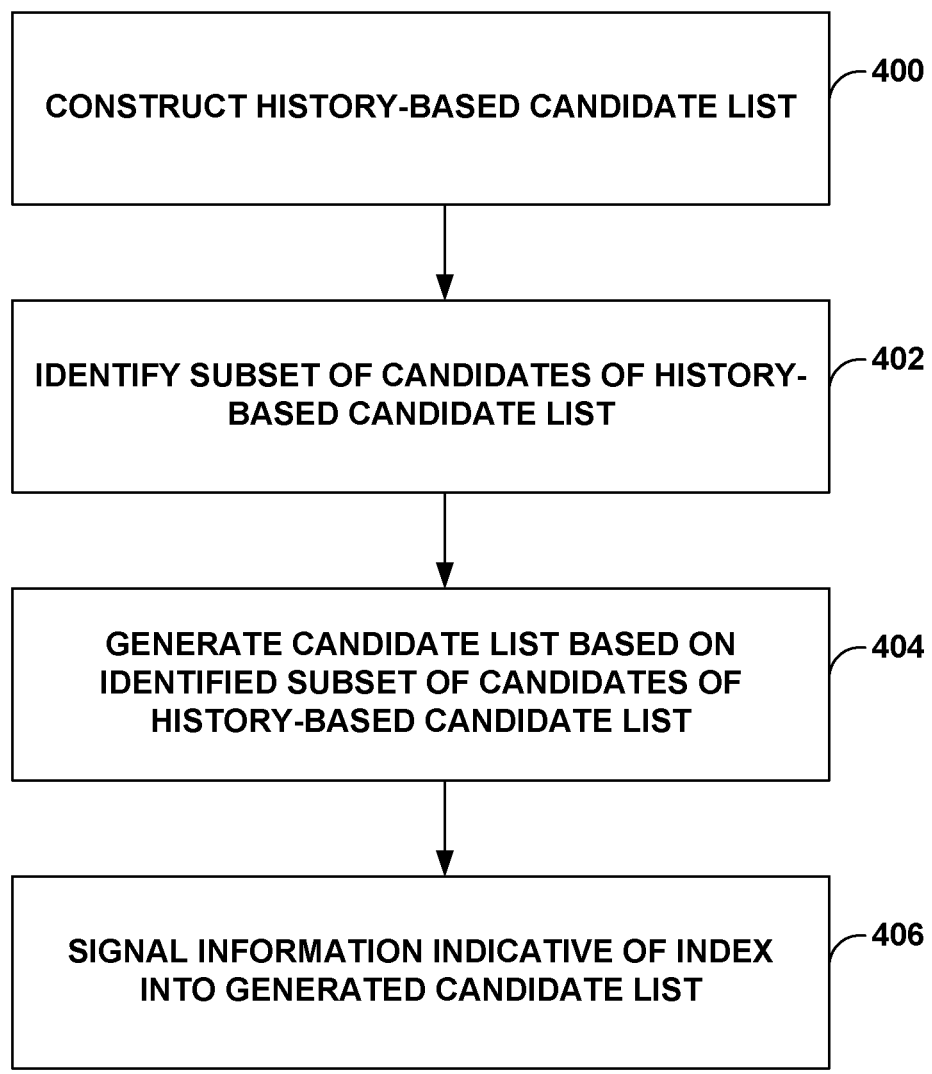
FIG. 9 is a flowchart illustrating an example method of encoding video data.

FIG. 9 is a flowchart illustrating an example method of encoding video data. The example techniques are described with respect to a processor such as video encoder 200. For instance, a memory (e.g., video data memory 230 or DPB 218) may store a history-based candidate list.

The processor (e.g., video encoder 200) may be configured to construct the history-based candidate list by storing motion information of reconstructed blocks into the history-based candidate list as candidates of the history-based candidate list (400). In some examples, the processor may construct the history-based candidate list without pruning the history-based candidate list.

The processor may identify a subset of candidates of the history-based candidate list (402). As one example, the processor may identify a first subset of one or more candidates of the history-based candidate list corresponding to motion information of recently reconstructed blocks and identify a second subset of one or more candidates of the history-based candidate list that excludes the first subset. In this example, to identify the subset of candidates of the history-based candidate list, the processor may be configured to identify the second subset of the one or more candidates of the history-based candidate list. In some examples, to identify the first subset of one or more candidates, the processor may be configured to identify two candidates of the history-based candidate list corresponding to motion information of two most recently reconstructed blocks.

As another example, to identify the subset of candidates, the processor may be configured to sub-sample the history-based candidate list to identify the subset of candidates. For example, to sub-sample the history-based candidate list, the processor may be configured to identify every fourth candidate in the history-based candidate list. Also, to sub-sample the history-based candidate list, the processor may be configured to sub-sample starting from an earliest added candidate in the history-based candidate list.

As another example, the processor may identify a first subset of one or more candidates of the history-based candidate list corresponding to motion information of recently reconstructed blocks and identify a second subset of one or more candidates of the history-based candidate list that excludes the first subset. In this example, to identify the subset of candidates of the history-based candidate list, the processor may sub-sample the second subset.

The processor may generate a candidate list based on the identified subset of candidates of the history-based candidate list (404). The candidate list may be one of a merge list or an advanced motion vector prediction (AMVP) list. For instance, the processor may add the subset of candidates to an initial merge or AMVP list to generate a final merge or AMVP list.

The processor may signal information indicative of an index into the generated candidate list to identify motion information used to reconstruct a current block (406). For example, with the index into the generated candidate list, video decoder 300 may determine motion information for the current block. Based on the motion information for the current block, video decoder 300 may determine a prediction block. The processor may also signal information indicative of a residual between a residual between a prediction block identified based on the motion information used to reconstruct the current block. Video decoder 300 may add the residual to the prediction block to reconstruct the current block.

Figure 10:
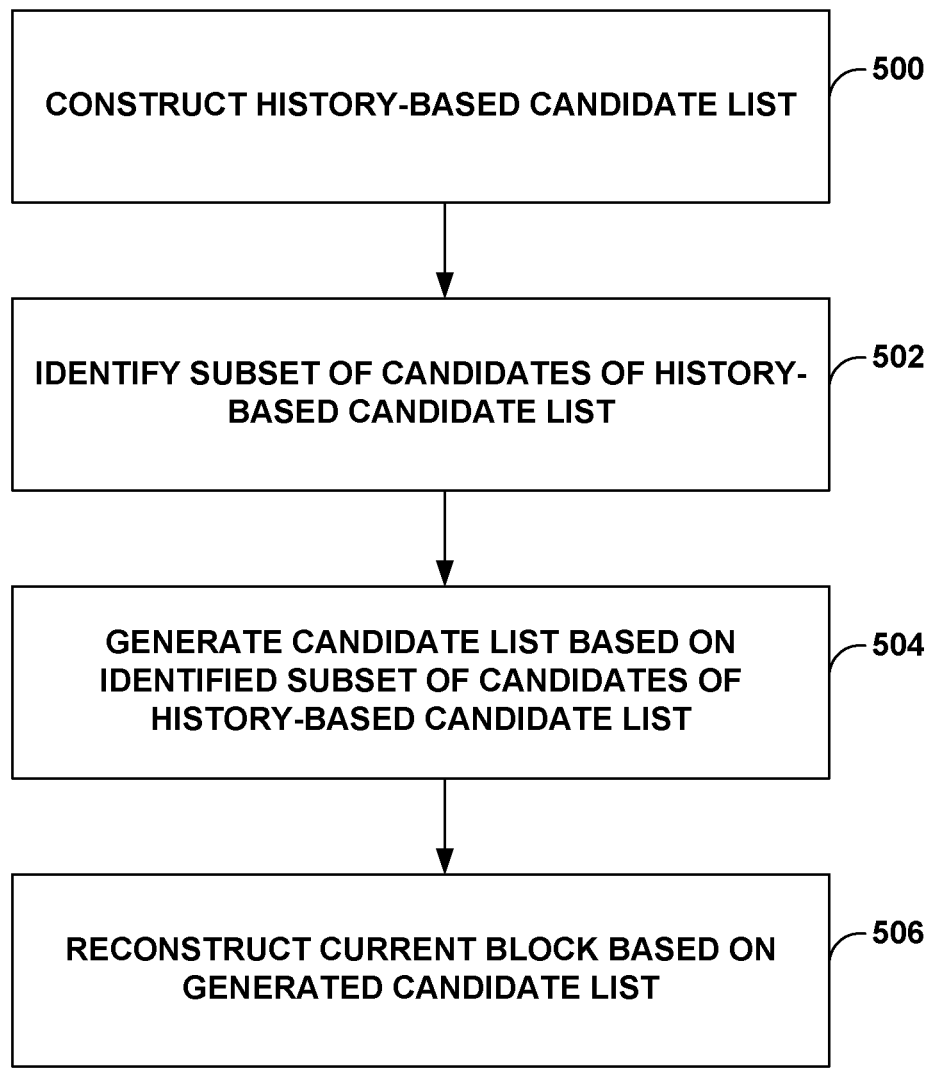
FIG. 10 is a flowchart illustrating an example method of decoding video data.

FIG. 10 is a flowchart illustrating an example method of decoding video data. The example techniques are described with respect to a processor (e.g., video decoder 300). For instance, a memory (e.g., DPB 314 or some other memory) may store a history-based candidate list.

The processor (e.g., video decoder 300) may be configured to construct the history-based candidate list by storing motion information of reconstructed blocks into the history-based candidate list as candidates of the history-based candidate list (500). In some examples, the processor may construct the history-based candidate list without pruning the history-based candidate list.

The processor may identify a subset of candidates of the history-based candidate list (502). As one example, the processor may identify a first subset of one or more candidates of the history-based candidate list corresponding to motion information of recently reconstructed blocks and identify a second subset of one or more candidates of the history-based candidate list that excludes the first subset. In this example, to identify the subset of candidates of the history-based candidate list, the processor may be configured to identify the second subset of the one or more candidates of the history-based candidate list. In some examples, to identify the first subset of one or more candidates, the processor may be configured to identify two candidates of the history-based candidate list corresponding to motion information of two most recently reconstructed blocks.

As another example, to identify the subset of candidates, the processor may be configured to sub-sample the history-based candidate list to identify the subset of candidates. For example, to sub-sample the history-based candidate list, the processor may be configured to identify every fourth candidate in the history-based candidate list. Also, to sub-sample the history-based candidate list, the processor may be configured to sub-sample starting from an earliest added candidate in the history-based candidate list.

As another example, the processor may identify a first subset of one or more candidates of the history-based candidate list corresponding to motion information of recently reconstructed blocks and identify a second subset of one or more candidates of the history-based candidate list that excludes the first subset. In this example, to identify the subset of candidates of the history-based candidate list, the processor may sub-sample the second subset.

The processor may generate a candidate list based on the identified subset of candidates of the history-based candidate list (504). The candidate list may be one of a merge list or an advanced motion vector prediction (AMVP) list. For instance, the processor may add the subset of candidates to an initial merge or AMVP list to generate a final merge or AMVP list.

The processor may reconstruct a current block based on the generated candidate list (506). For example, the processor may receive information indicative of an index into the generated candidate list and determine motion information for the current block based on motion information stored in the generated candidate list identified by the index into the generated candidate list. The processor may determine a prediction block based on the determined motion information, receive information indicative of a residual between the prediction block and the current block, and reconstruct the current block based on the residual and the prediction block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   constructing an initial candidate list based on spatial neighboring motion vector candidates;
   constructing a history-based candidate list by storing motion information of reconstructed blocks into the history-based candidate list as candidates of the history-based candidate list;
   identifying a subset of candidates of the history-based candidate list by:
      excluding motion information of two most recently reconstructed blocks of the history-based candidate list;
      identifying motion information of a third most recently reconstructed block of the history-based candidate list; and
      identifying motion information of every fourth candidate after the third most recently reconstructed block of the history-based candidate list;
   generating a candidate list based on the identified subset of candidates of the history-based candidate list and the initial candidate list, wherein the candidate list excludes candidates other than the identified subset of candidates of the history-based candidate list; and
   reconstructing a current block based on the generated candidate list.

2. The method of claim 1, further comprising:
   identifying a first subset of one or more candidates of the history-based candidate list corresponding to motion information of recently reconstructed blocks; and
   identifying a second subset of one or more candidates of the history-based candidate list that excludes the first subset,
   wherein identifying the subset of candidates of the history-based candidate list comprises identifying the second subset of the one or more candidates of the history-based candidate list.

3. The method of claim 2, wherein identifying the first subset of one or more candidates comprises identifying two candidates of the history-based candidate list corresponding to motion information of two most recently reconstructed blocks, and wherein identifying the subset of candidates of the history-based candidate list comprises identifying the second subset of the one or more candidates of the history-based candidate list.

4. The method claim 1, wherein identifying the subset of candidates of the history-based candidate list comprises sub-sampling the history-based candidate list by sub-sampling starting from an earliest added candidate in the history-based candidate list.

5. The method of claim 1, wherein constructing the history-based candidate list comprises constructing the history-based candidate list without pruning the history-based candidate list.

6. The method of claim 1, wherein the candidate list comprises one of a merge list or an advanced motion vector prediction (AMVP) list.

7. The method of claim 1, further comprising:
   identifying a first subset of one or more candidates of the history-based candidate list corresponding to motion information of recently reconstructed blocks; and
   identifying a second subset of one or more candidates of the history-based candidate list that excludes the first subset,
   wherein identifying the subset of candidates of the history-based candidate list comprises sub-sampling the second subset.

8. The method of claim 1, wherein reconstructing a current block based on the generated candidate list comprises:
   receiving information indicative of an index into the generated candidate list;
   determining motion information for the current block based on motion information stored in the generated candidate list identified by the index into the generated candidate list;
   determining a prediction block based on the determined motion information;
   receiving information indicative of a residual between the prediction block and the current block; and
   reconstructing the current block based on the residual and the prediction block.

9. A device for decoding video data, the device comprising:
   a memory configured to store a history-based candidate list; and
   a processor configured to:
      construct an initial candidate list based on spatial neighboring motion vector candidates;
      construct the history-based candidate list by storing, in the memory, motion information of reconstructed blocks into the history-based candidate list as candidates of the history-based candidate list;
      identify a subset of candidates of the history-based candidate list, wherein to identify the subset of candidates, the processor is further configured to:
         exclude motion information of two most recently reconstructed blocks of the history-based candidate list;
         identify motion information of a third most recently reconstructed block of the history-based candidate list; and
         identify motion information of every fourth candidate after the third most recently reconstructed block of the history-based candidate list;
      generate a candidate list based on the identified subset of candidates of the history-based candidate list and the initial candidate list, wherein the candidate list excludes candidates other than the identified subset of candidates of the history-based candidate list; and
      reconstruct a current block based on the generated candidate list.

10. The device of claim 9, wherein the processor is configured to:
    identify a first subset of one or more candidates of the history-based candidate list corresponding to motion information of recently reconstructed blocks; and
    identify a second subset of one or more candidates of the history-based candidate list that excludes the first subset,
    wherein to identify the subset of candidates of the history-based candidate list, the processor is configured to identify the second subset of the one or more candidates of the history-based candidate list.

11. The device of claim 10, wherein to identify the first subset of one or more candidates, the processor is configured to identify two candidates of the history-based candidate list corresponding to motion information of two most recently reconstructed blocks, and wherein to identify the subset of candidates of the history-based candidate list, the processor is configured to identify the second subset of the one or more candidates of the history-based candidate list.

12. The device claim 9, wherein to identify the subset of candidates of the history-based candidate list, the processor is configured to sub-sample starting from an earliest added candidate in the history-based candidate list.

13. The device of claim 9, wherein to construct the history-based candidate list, the processor is configured to construct the history-based candidate list without pruning the history-based candidate list.

14. The device of claim 9, wherein the candidate list comprises one of a merge list or an advanced motion vector prediction (AMVP) list.

15. The device of claim 9, wherein the processor is configured to:
 identify a first subset of one or more candidates of the history-based candidate list corresponding to motion information of recently reconstructed blocks; and
 identify a second subset of one or more candidates of the history-based candidate list that excludes the first subset,
 wherein to identify the subset of candidates of the history-based candidate list, the processor is configured to sub-sample the second subset.

16. The device of claim 9, wherein to reconstruct a current block based on the generated candidate list, the processor is configured to:
 receive information indicative of an index into the generated candidate list;
 determine motion information for the current block based on motion information stored in the generated candidate list identified by the index into the generated candidate list;
 determine a prediction block based on the determined motion information;
 receive information indicative of a residual between the prediction block and the current block; and
 reconstruct the current block based on the residual and the prediction block.

17. The device of claim 9, wherein the processor comprises a video decoder comprising at least one of fixed-function or programmable circuitry.

18. A method of encoding video data, the method comprising:
 constructing an initial candidate list based on spatial neighboring motion vector candidates;
 constructing a history-based candidate list by storing motion information of reconstructed blocks into the history-based candidate list as candidates of the history-based candidate list;
 identifying a subset of candidates of the history-based candidate list by:
  excluding motion information of two most recently reconstructed blocks of the history-based candidate list;
  identifying motion information of a third most recently reconstructed block of the history-based candidate list; and
  identifying motion information of every fourth candidate after the third most recently reconstructed block of the history-based candidate list;
 generating a candidate list based on the identified subset of candidates of the history-based candidate list and the initial candidate list, wherein the candidate list excludes candidates other than the identified subset of candidates of the history-based candidate list; and
 signaling information indicative of an index into the generated candidate list to identify motion information used to reconstruct a current block.

19. The method of claim 18, further comprising:
 identifying a first subset of one or more candidates of the history-based candidate list corresponding to motion information of recently reconstructed blocks; and
 identifying a second subset of one or more candidates of the history-based candidate list that excludes the first subset,
 wherein identifying the subset of candidates of the history-based candidate list comprises identifying the second subset of the one or more candidates of the history-based candidate list.

20. The method of claim 19, wherein identifying the subset of candidates comprises sub-sampling the history-based candidate list to identify the subset of candidates, and wherein identifying the subset of candidates of the history-based candidate list comprises identifying the second subset of the one or more candidates of the history-based candidate list.

21. The method of claim 18, wherein constructing the history-based candidate list comprises constructing the history-based candidate list without pruning the history-based candidate list.

22. The method of claim 18, further comprising:
 identifying a first subset of one or more candidates of the history-based candidate list corresponding to motion information of recently reconstructed blocks; and
 identifying a second subset of one or more candidates of the history-based candidate list that excludes the first subset,
 wherein identifying the subset of candidates of the history-based candidate list comprises sub-sampling the second subset.

23. The method of claim 18, further comprising:
 signaling information indicative of a residual between a prediction block identified based on the motion information used to reconstruct the current block.

24. A device for encoding video data, the device comprising:
 a memory configured to store a history-based candidate list; and
 a processor configured to:
  construct an initial candidate list based on spatial neighboring motion vector candidates;
  construct the history-based candidate list by storing, in the memory, motion information of reconstructed blocks into the history-based candidate list as candidates of the history-based candidate list;
  identify a subset of candidates of the history-based candidate list, wherein to identify the subset of candidates, the processor is further configured to:
   exclude motion information of two most recently reconstructed blocks of the history-based candidate list;
   identify motion information of a third most recently reconstructed block of the history-based candidate list; and
   identify motion information of every fourth candidate after the third most recently reconstructed block of the history-based candidate list;
  generate a candidate list based on the identified subset of candidates of the history-based candidate list and the initial candidate list, wherein the candidate list excludes candidates other than the identified subset of candidates of the history-based candidate list; and signal information indicative of an index into the generated candidate list to identify motion information used to reconstruct a current block.

25. The device of claim 24, wherein the processor is configured to:
   identify a first subset of one or more candidates of the history-based candidate list corresponding to motion information of recently reconstructed blocks; and
   identify a second subset of one or more candidates of the history-based candidate list that excludes the first subset,
   wherein to identify the subset of candidates of the history-based candidate list, the processor is configured to identify the second subset of the one or more candidates of the history-based candidate list.

26. The device of claim 24, wherein to construct the history-based candidate list, the processor is configured to construct the history-based candidate list without pruning the history-based candidate list.

27. The device of claim 24, wherein the processor is configured to:
   identify a first subset of one or more candidates of the history-based candidate list corresponding to motion information of recently reconstructed blocks; and
   identify a second subset of one or more candidates of the history-based candidate list that excludes the first subset,
   wherein to identify the subset of candidates of the history-based candidate list, the processor is configured to sub-sample the second subset.

28. The device of claim 24, wherein the processor is configured to:
   signal information indicative of a residual between a prediction block identified based on the motion information used to reconstruct the current block.

29. The device of claim 24, wherein the processor comprises a video encoder comprising at least one of fixed-function or programmable circuitry.

* * * * *